United States Patent
Koncelik, Jr.

(10) Patent No.: US 8,887,749 B2
(45) Date of Patent: Nov. 18, 2014

(54) METHOD AND APPARATUS FOR WATERING

(76) Inventor: Lawrence J. Koncelik, Jr., East Hampton, NY (US)

( * ) Notice: Subject to any disclaimer, the term of this patent is extended or adjusted under 35 U.S.C. 154(b) by 149 days.

(21) Appl. No.: 13/543,965

(22) Filed: Jul. 9, 2012

(65) Prior Publication Data

US 2014/0007946 A1 Jan. 9, 2014

(51) Int. Cl.
| | |
|---|---|
| *E03B 3/00* | (2006.01) |
| *F16K 51/00* | (2006.01) |
| *F16L 1/024* | (2006.01) |
| *F16L 55/10* | (2006.01) |
| *F16L 55/16* | (2006.01) |

(52) U.S. Cl.
USPC ............. 137/15.08; 137/861; 138/99; 405/43

(58) Field of Classification Search
CPC ....... A01G 25/02; F16K 27/041; F16K 27/12; F16K 31/445
USPC .............. 137/861, 865, 872–874, 862, 15.08; 239/258, 259, 257, 254, 253; 405/43, 405/45, 39; 251/343, 347, 120–121; 138/110, 121, 97–99
See application file for complete search history.

(56) References Cited

U.S. PATENT DOCUMENTS

| | | | | |
|---|---|---|---|---|
| 2,798,768 | A | | 7/1957 | Babin ........................... 239/145 |
| 3,315,986 | A | * | 4/1967 | Quick .......................... 285/21.1 |
| 4,948,295 | A | * | 8/1990 | Pramsoler ....................... 405/44 |
| 5,169,176 | A | | 12/1992 | Brossard ......................... 285/21 |
| RE37,279 | E | * | 7/2001 | Fisher et al. ................... 138/156 |
| 6,260,769 | B1 | * | 7/2001 | Hoover .......................... 239/145 |
| 2008/0298897 | A1 | | 12/2008 | Reichelt et al. .................. 405/45 |

OTHER PUBLICATIONS http://www.engineeringtoolbox.com/pipes-temperature-expansion-coefficients-d 48.html, retrieved Jan. 8, 2014.*

* cited by examiner

*Primary Examiner* — Elizabeth Houston
*Assistant Examiner* — Michael R Reid
(74) *Attorney, Agent, or Firm* — Walter J. Tencza, Jr.

(57) ABSTRACT

An apparatus including flexible tube having a first opening at a first end, an opposing second opening at a second end, and a body portion between the first end and the second end. The body portion of the flexible tube may have an inner cavity and a plurality of further openings leading out from the inner cavity. The apparatus may include a first connector, configured to be connected to a water source. The apparatus may further include a non-porous first outer member, having a first opening at a first end, an opposing second opening at a second end, and a body portion between the first end of the first outer member and the second end of the first outer member. The first outer member may substantially surround a portion of the flexible tube to block a first set of the plurality of further openings to inhibit liquid flow.

15 Claims, 7 Drawing Sheets

METHOD AND APPARATUS FOR WATERING

FIELD OF THE INVENTION

This invention relates to improved methods and apparatus concerning watering of plants or lawns.

BACKGROUND OF THE INVENTION

A common apparatus used for irrigation of a garden is a soaker hose and/or sprinkler hose. Generally a soaker hose comprises a hollow conduit with a first end (hereafter sometimes referred to as the "supply end") that can be attached to a water supply unit and a second distal end that can be selectively closed by use of an end cap. Alternatively, the second end can be linked to the supply side of a second soaker hose, which second soaker hose can have an end cap. The water runs into the supply end from a water spigot and through the soaker hose to the distal closed end of the hose where the end cap prevents the water from exiting the distal end if the end cap is installed at the second end of the soaker hose. When the exit end of the soaker hose is closed off by use of an end cap or any other means, the water within the hose exits through the numerous seep holes that traverse the walls of the hose. The water that exits the seep holes in the walls of the soaker hose drip into the ground beneath the soaker hose thereby providing irrigation to the plants growing in the proximity of the damped earth beneath the soaker hose.

A sprinkler hose operates in a similar matter except that the holes through the walls of a sprinkler hose are of such a size or number that the water can spray a distance from the hose. Henceforth, the term "soaker hose" shall include a sprinkler hose.

Often a soaker hose is used to water bushes or trees that are planted a short distance apart from each other. While the portion of the soaker hose that is placed near and/or around the bush or tree or vegetation will enable the ground there under to be irrigated, all the water that seeps through the hose portion that lies in between the plants leak into the ground where irrigation may not be required or even desired. Thus the water the leaks into this non irrigation area is wasted. This is because the water in the hose indiscriminately seeps through all of the holes along the length of the soaker hose and not just through the holes of the portions of the soaker hose that is adjacent to the vegetation intended by the user to be irrigated by use of the soaker hose.

SUMMARY OF THE INVENTION

In at least one embodiment of the present invention a device is added to or made part of a soaker hose that lays on a ground surface in-between bushes, shrubs, trees or flowers or other vegetation, where watering is desired, to not leak water into the ground while the portion of the soaker hose that is adjacent to the vegetation intended to be irrigated drips water into the ground to irrigate the nearby vegetation.

The selective irrigation by a soaker hose, or by a plurality of soaker hoses that are linked together to other soaker hoses, is achieved, in at least one embodiment, by affixing an outer core around the soaker hose that is non-porous/non-water permeable along the length of the soaker hose where irrigation is not needed or desired. In at least one embodiment, this outer encasement can be selectively attached or detached by the user along selective portions of the soaker hose. In this manner, the user may affix the outer water barrier around the soaker hose to prohibit the water from dripping out of the pores in the soaker hose to the ground beneath the soaker hose or in the proximity of the soaker hose. In this way, the vegetation being irrigated by a soaker hose can be irrigated while the area where irrigation is not to occur will not be irrigated.

In at least one embodiment, an apparatus is provided which includes a flexible tube having a first opening at a first end, an opposing second opening at a second end, and a body portion between the first end and the second end. The body portion of the flexible tube may have an inner cavity. The body portion of the flexible tube may have a plurality of further openings leading out from the inner cavity. Each of the plurality of further openings may be smaller than the first opening and the second opening. The apparatus may include a first connector connected at the second end of the flexible tube, wherein the first connector is configured to be connected to a water source. The apparatus may further include a first outer member having a first opening at a first end, an opposing second opening at a second end, and a body portion between the first end of the first outer member and the second end of the first outer member, wherein the body portion of the first outer member is non porous.

The first outer member may substantially surround a portion of the flexible tube so that the first outer member blocks a first set of the plurality of further openings to inhibit liquid flow from the first set of the plurality of further openings. The first outer member may be configured so that it can be attached or detached to the flexible tube, wherein when attached the first outer member blocks the first set of the plurality of further openings to inhibit liquid flow from the first set of the plurality of further openings, and wherein when detached the first outer member does not block the first set of the plurality of further openings to inhibit liquid flow from the first set of the plurality of further openings. The first outer member may be configured so that it can be slid along an outer surface of the body portion of the flexible tube from a first state to a second state, wherein in the first state the first outer member is configured to block the first set of the plurality of further openings to inhibit liquid flow from the first set of the plurality of further openings, and wherein in the second state the first outer member is configured to block a second set of the plurality of further openings to inhibit liquid flow from the second set of the plurality of further openings. The first set and the second set of openings are different.

The first outer member may be configured so that it can be stretched from a first state to a second state, In the first state the first outer member is configured to block the first set of the plurality of further openings to inhibit liquid flow from the first set of the plurality of further openings; and in the second state the first outer member is configured to block a second set of the plurality of further openings to inhibit liquid flow from the second set of the plurality of further openings. In at least one embodiment, the second set includes the first set of the plurality of further openings and an additional one or more openings of the plurality of further openings.

The apparatus may further include a second outer member having a first opening at a first end, an opposing second opening at a second end, and a body portion between the first end of the second outer member and the second end of the second outer member, wherein the body portion of the second outer member is non porous. The second outer member may substantially surround a portion of the flexible tube so that the second outer member blocks a second set of the plurality of further openings to inhibit liquid flow from the second set of the plurality of further openings.

The first outer member may be configured so that it can be attached or detached to the flexible tube, wherein when attached the first outer member blocks the first set of the plurality of further openings to inhibit liquid flow from the first set of the plurality of further openings, and wherein when detached the first outer member does not block the first set of the plurality of further openings to inhibit liquid flow from the first set of the plurality of further openings. The second outer member may be configured so that it can be attached or detached to the flexible tube, wherein when attached the second outer member blocks the second set of the plurality of further openings to inhibit liquid flow from the second set of the plurality of further openings, and wherein when detached the second outer member does not block the second set of the plurality of further openings to inhibit liquid flow from the second set of the plurality of further openings.

The first outer member may be configured so that it can be slid along an outer surface of the body portion of the flexible tube from a first state to a second state, wherein in the first state the first outer member is configured to block the first set of the plurality of further openings to inhibit liquid flow from the first set of the plurality of further openings, and wherein in the second state the first outer member is configured to block a third set of the plurality of further openings to inhibit liquid flow from the third set of the plurality of further openings. The first set and the third set are typically different.

The second outer member may be configured so that it can be slid along an outer surface of the body portion of the flexible tube from a third state to a fourth state, wherein in the third state the second outer member is configured to block the second set of the plurality of further openings to inhibit liquid flow from the second set of the plurality of further openings, and wherein in the fourth state the first outer member is configured to block a fourth set of the plurality of further openings to inhibit liquid flow from the fourth set of the plurality of further openings. The second set and the fourth set are typically different.

In at least one embodiment, the first outer member is configured so that it can be stretched from a first state to a second state. In the first state the first outer member is configured to block the first set of the plurality of further openings to inhibit liquid flow from the first set of the plurality of further openings, and in the second state the first outer member is configured to block a third set of the plurality of further openings to inhibit liquid flow from the third set of the plurality of further openings. In at least one embodiment, the third set includes the first set of the plurality of further openings and an additional one or more openings of the plurality of further openings.

In at least one embodiment, the second outer member is configured so that it can be stretched from a third state to a fourth state, wherein in the third state the second outer member is configured to block the second set of the plurality of further openings to inhibit liquid flow from the second set of the plurality of further openings, and wherein in the fourth state the second outer member is configured to block a fourth set of the plurality of further openings to inhibit liquid flow from the fourth set of the plurality of further openings. The fourth set may include the second set of the plurality of further openings and an additional one or more openings of the plurality of further openings.

In at least one embodiment, the first outer member may be configured so that it automatically stretches in response to a variation in temperature; and the second outer member may be configured so that it automatically stretches in response to a variation in temperature.

In at least one embodiment the first outer member is configured so that it can be compressed from a non compressed state to a compressed state, wherein in the non compressed state the first outer member is configured to block the first set of the plurality of further openings so that liquid flow from the first set of the plurality of further openings flows out the first end and the second end of the first outer member; and wherein in the compressed state the first outer member is configured to block the first set of the plurality of further openings to prevent liquid flow from the first set of the plurality of further openings, so that no liquid from the first set of the plurality of further openings flows out of the first end or the second end of the first outer member.

In at least one embodiment, a method is provided comprising connecting a first end of a flexible tube to a water source; and placing part of the flexible tube on a ground surface while the first end of the flexible tube is connected to the water source. The ground surface includes a first section and a second section. The flexible tube may include a body portion having a plurality of openings including a first set of openings and a second set of openings, wherein the first set and the second set are different. The part of the flexible tube may be placed on the ground surface so that water comes out of the first set of openings in the flexible tube and falls onto the first section of the ground surface, and water from the second set of openings in the flexible tube is inhibited from falling onto the second section of the ground surface by a first outer member, which is non porous, and which blocks the second set of openings.

In one or more embodiments, the method may be implemented by a flexible tube and/or apparatus having features as previously described.

BRIEF DESCRIPTION OF THE DRAWINGS

FIG. 10 shows a front view of the apparatus of FIG. 1A.

DETAILED DESCRIPTION OF THE DRAWINGS

Figure 1A:
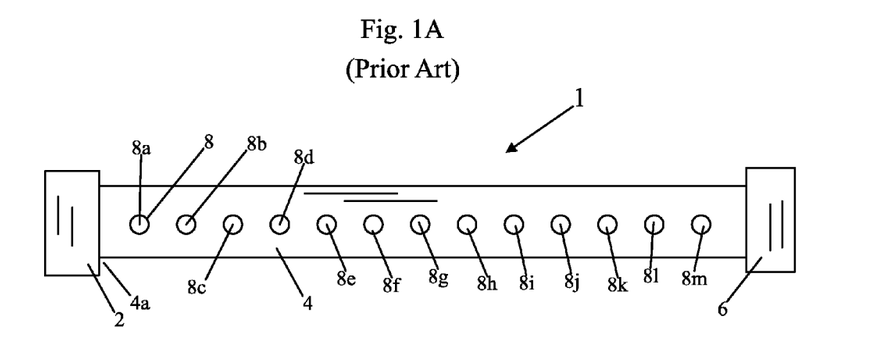
FIG. 1A shows a right side view of a prior art apparatus.
Figure 1B:
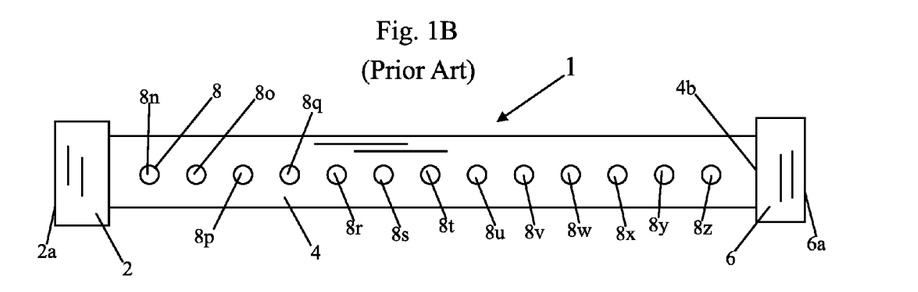
FIG. 1B shows a left side view of the apparatus of FIG. 1A.
Figure 1C:
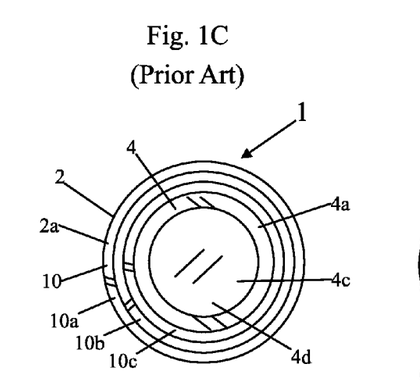
FIG. 1D shows a rear view of the apparatus of FIG. 1A.
FIG. 1E shows a front, right side, and top perspective view of the apparatus of FIG. 1A.
Figure 1D:
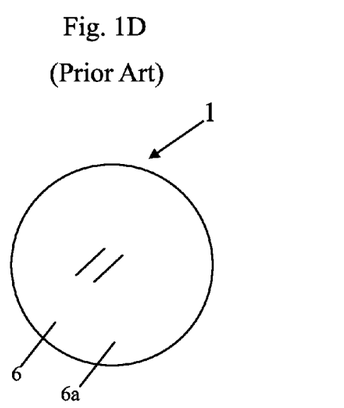
Figure 1E:
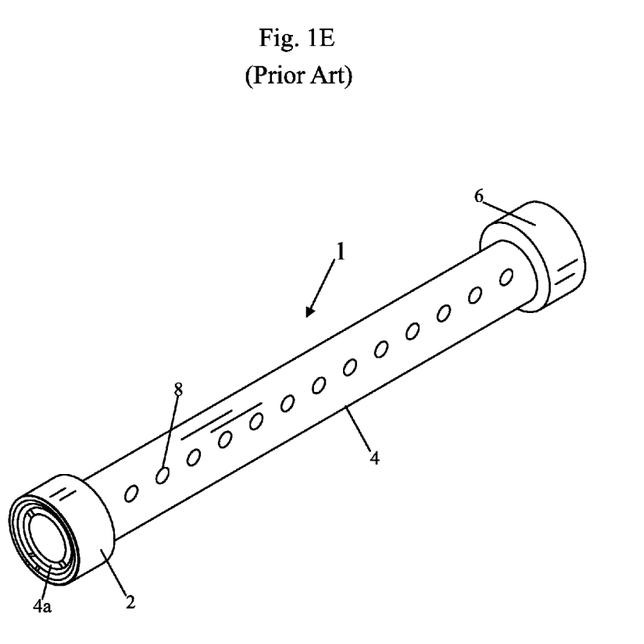

FIG. 1A shows a right side view of a prior art apparatus 1. FIG. 1B shows a left side view of the apparatus 1. FIG. 1C shows a front view of the apparatus 1. FIG. 1D shows a rear view of the apparatus 1. FIG. 1E shows a front, right side, and top perspective view of the apparatus 1.

Referring to FIGS. 1A-1E, the apparatus 1 includes a connector 2, substantially cylindrical body portion 4, and a cap 6. The body portion 4 may be a hollow hose having a plurality of openings 8, which includes openings 8a, 8b, 8c, 8d, 8e, 8f, 8g, 8h, 8i, 8j, 8k, 8l, and 8m shown in FIG. 1A and openings 8n, 8o, 8p, 8q, 8r, 8s, 8t, 8u, 8v, 8w, 8x, 8y, and 8z shown in FIG. 1B.

As shown in FIG. 1C, the connector 2 has a plurality of inner grooves 10, which include grooves 10a, 10b, and 10c. The connector 2 has an end 2a shown in FIG. 1B and FIG. 1C. The connector 2 may be or may be replaced by a female garden hose connector or may be or may be replaced by a male garden hose connector for connecting to another hose or for connecting to a water supply.

The body portion 4 encloses a chamber 4c. Water from a water source connected to connector 2 at end 2a, can flow through an opening 4d at the end 4a of the body portion 4 into the chamber 4c. The water flows through the chamber 4c in the body portion 4, and escapes through the openings 8a-8z. The water does not escape through opening 4b since opening 4b is closed off by cap 6 and end 6a.

The apparatus 1 is known in the art as a soaker hose or a sprinkler hose and is used to irrigate plants or lawns.

Figure 2A:
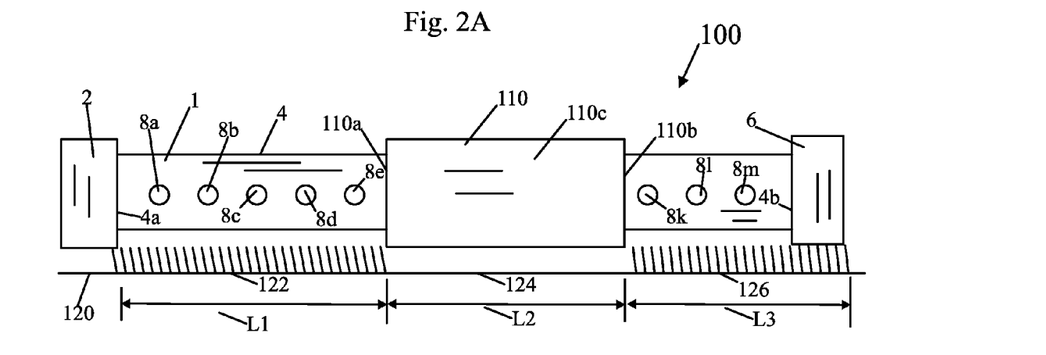
FIG. 2A shows a right side view of a first apparatus in accordance with an embodiment of the present invention, with the first apparatus shown in a first state, and located on a first ground surface.
Figure 2B:
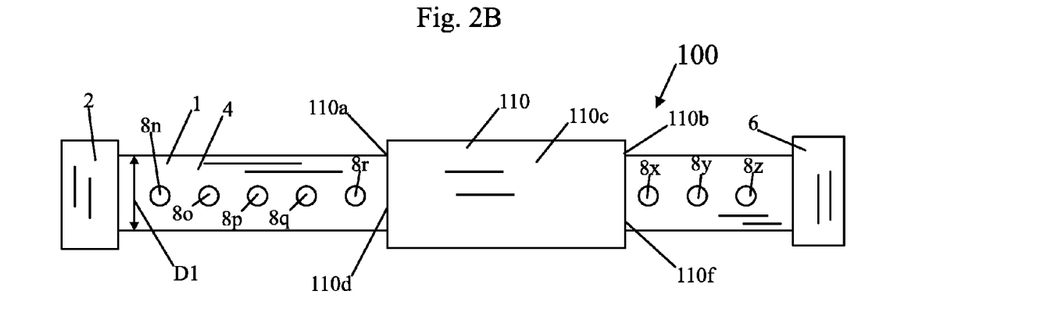
FIG. 2B shows a left side view of the first apparatus of FIG. 2A, with the first apparatus shown in the first state.
Figures 2C, 2D:
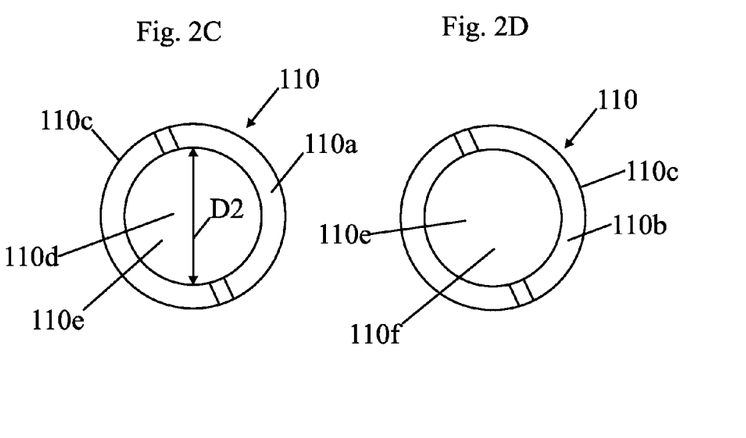
FIG. 2C shows a front view of a portion of the first apparatus of FIG. 2A.
FIG. 2D shows a rear view of the portion of FIG. 2C.
Figure 2E:
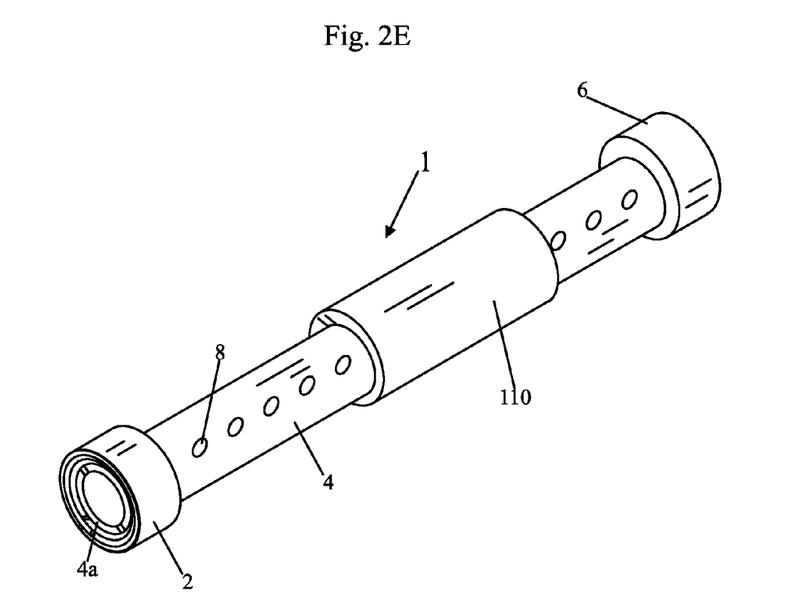
FIG. 2E shows a front, right side, and top perspective view of the first apparatus of FIG. 2A, with the first apparatus shown in the first state.
Figure 2F:
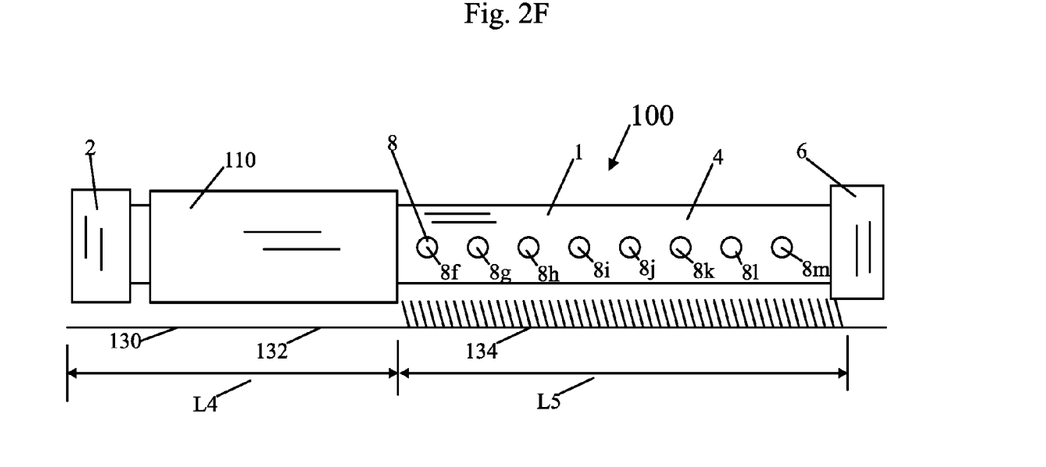
FIG. 2F shows a right side view of the first apparatus of FIG. 2A with the first apparatus shown in a second state, and located on a second ground surface.

FIG. 2A shows a right side view of a first apparatus 100 in accordance with an embodiment of the present invention, with the first apparatus 100 shown in a first state, and located on a first ground surface 120. FIG. 2B shows a left side view of the first apparatus 100 of FIG. 2A, with the first apparatus 100 shown in the first state. FIG. 2C shows a front view of a portion 110 of the first apparatus 100 of FIG. 2A. FIG. 2D shows a rear view of the portion 110. FIG. 2E shows a front, right side, and top perspective view of the first apparatus 100, with the first apparatus 100 shown in the first state. FIG. 2F shows a right side view of the first apparatus 100 with the first apparatus 100 shown in a second state, and located on a second ground surface 130.

Referring to FIGS. 2A-2F, the apparatus 100 includes the apparatus or soaker hose 1 which is known and a portion 110. The portion 110 may be a hollow tube which is substantially or entirely a hollow cylinder. The portion 110 has an end 110a, an opposing end 110b, a body portion 110c, an opening 110d, a hollow chamber 110e, and an opposing opening 110f.

As shown by the combination of FIGS. 2A, 2B, and 2E the portion 110 blocks the openings 8f-8j and 8s-8w. This prevents water from flowing out of openings 8f-8j and 8s-8w. In FIG. 2A, the apparatus 100 has been placed on the ground surface 120. The ground surface 120 includes sections 122, 124, and 126. Section 122 may include or may consist entirely of grass, vegetation, or some type of plant; section 124 may include or may consist entirely of concrete or some other surface; and section 126 may include or may consist entirely of grass, vegetation or some type of plant. In the state shown in FIG. 2A, the portion 110 by preventing water from flowing out of the body portion 4 through openings 8f-8j and 8s-8w, substantially prevents water from flowing onto the section 124 from the body portion 4. This allows less water or no water to be wasted on a section or area of the ground surface 120 which a person does not want to water.

The section 122 may have a length L1; the section 124 may have a length L2; and the section 126 may have a length L3. The lengths L1, L2, and L3 are shown shortened in FIG. 2A for descriptive purposes but may be much longer. For example, each of L1, L2, and L3 may be ten feet or more. The lengths for L1, L2, and L3 may differ and may be any length.

In FIG. 2F, the apparatus 100 has been put into a different state from FIG. 2A. The portion 110 in FIG. 2F has been slid to cover different openings from the state of FIG. 2A. In FIG. 2F the portion 110 covers openings 8a-8e and 8n-8r. The apparatus 100 has been placed on the ground surface 130. The ground surface 130 includes sections 132 and 134. Section 132, for example, may be a sidewalk or concrete, while section 134 may be grass, vegetation, or a plant.

In FIG. 2F the portion 110 prevents water from coming out of the openings 8a-8e and 8n-8r to prevent or substantially prevent water from going on the section 132, such as a sidewalk or area where water is not desired. Water from a water source connected to connector 2, comes into the opening 4d into the chamber 4c of the body portion 4, and flows out of the openings 8f-8m and 8s-8z onto the section 134, which may include grass, plants, or other vegetation. Thus by sliding the portion 110 along the body portion 4, the region or area which is watered or irrigated can be altered.

In FIG. 2F the section 132 has a length of L4 and the section 134 has a length of L5. The lengths L4 and L5 may be any length, and are shown in a compacted form in FIG. 2F only for ease of description.

Figure 3A:
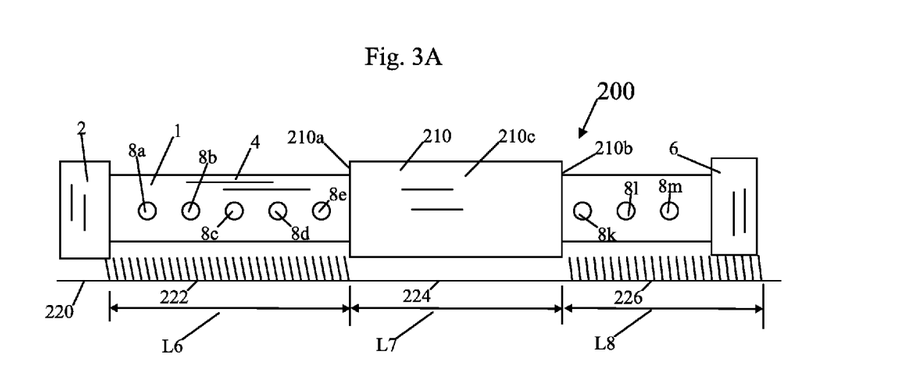
FIG. 3A shows a right side view of a second apparatus in accordance with another embodiment of the present invention with the second apparatus shown in a third state, and located on a third ground surface.

FIG. 3A shows a right side view of a second apparatus 200 in accordance with another embodiment of the present invention with the second apparatus 200 shown in a third state, and located on a third ground surface 220. The second apparatus 200 includes the apparatus 1 of FIG. 1A and also includes a portion 210. The portion 210 may be made substantially or entirely of an expandable tubular material. The portion 210 may have an end 210a, an opposing end 210b, and a body portion 210c. In FIG. 3A the portion 210 is shown in a compressed or third state, and the portion 210 is covering openings 8f-8j and 8s-8w (similar to as shown in FIG. 2B). In the state of FIG. 3A water coming in from a water source attached to the connector 2, through the opening 4d into the chamber 4c of the body portion 4, flows out of the openings 8a-8e, and 8k-8m, and is prevented or substantially prevented from flowing out of the openings 8f-8j and 8s-8w.

The second apparatus 200 is shown placed on a ground surface 220, which includes sections 222, 224, and 226. The portion 210 has been placed in FIG. 3A so that water flows on the sections 222 and 226, but does not flow on or does not substantially flow on the section 224. The sections 222 and 226 may include vegetation, while the section 224 may include a sidewalk or some other area where watering is not desired. The sections 222, 224, and 226, may have lengths of L6, L7, and L8, each of which may be any length, although shown in a shortened form for descriptive purposes in FIG. 3A.

Figure 3B:
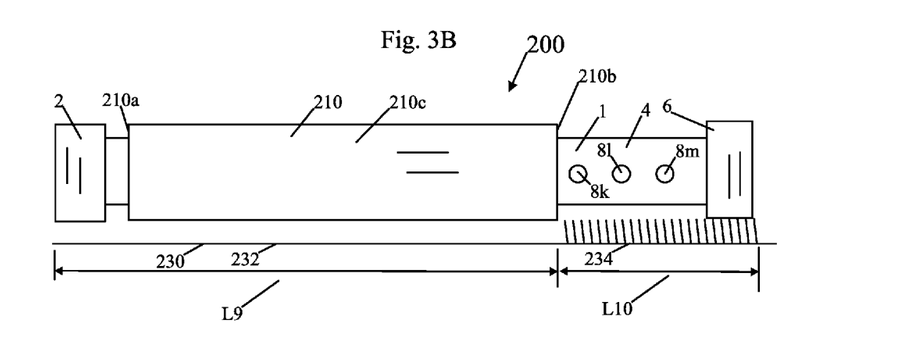
FIG. 3B shows a right side view of the second apparatus of FIG. 3A with the second apparatus shown in a fourth state, and located on a fourth ground surface.

FIG. 3B shows a right side view of the second apparatus 200 of FIG. 3A with the second apparatus 200 shown in a fourth state, and located on a fourth ground surface 230. In FIG. 3B, the portion 210 has been expanded or stretched so that the portion 210 now covers the openings 8a-8j and 8o-8w. In FIG. 3B, the ground surface 230 includes sections 232 and 234. Section 232 may be a sidewalk or other area where watering is not desired, and section 234 may be vegetation or other area where watering is desired. If FIG. 3B, water flowing from a water source, such as an outdoor water spigot, faucet or other water source, into the connector 2, into the opening 4*d*, into the chamber 4*c* of the body portion 4, will flow out of the openings 8*k*-8*m* and 8*x*-8*z*, but will not flow out of or will substantially not flow out of the openings 8*a*-1 and 8*n*-*w*. The sections 232 and 234 may have lengths of L9 and L10 which may be any length but which are shown shortened in FIG. 3B for descriptive purposes.

Figure 4:
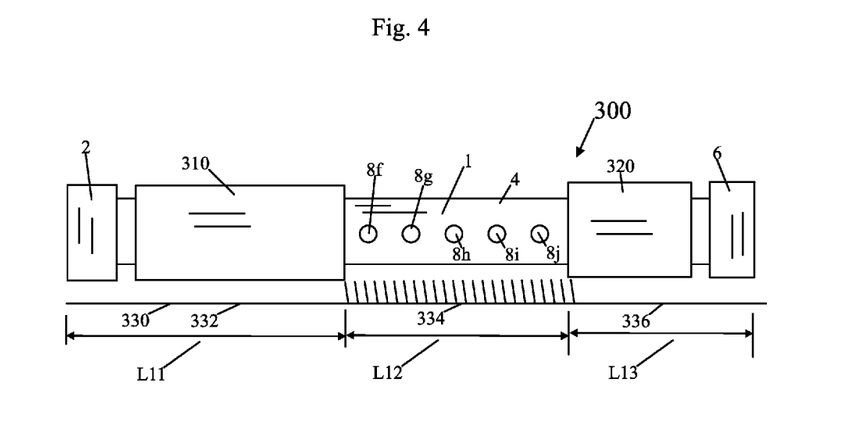
FIG. 4 shows a right side view of a third apparatus in accordance with another embodiment of the present invention with the third apparatus shown in a fourth state, and located on a fourth ground surface.

FIG. 4 shows a right side view of a third apparatus 300 in accordance with another embodiment of the present invention with the third apparatus 300 shown in a fourth state, and located on a fourth ground surface 330. The third apparatus 300 includes the apparatus 1 and portions 310 and 320. Each of the portions 310 and 320 may be similar to or identical to portions 110 and 210 previously described or portion 410 which will be described with reference to FIGS. 5A-5D. In FIG. 4, the apparatus 300 has been placed on ground surface 330, which includes sections 332, 334, and 336. The sections 332 and 336 may be sidewalks or other areas where watering is not desired. The section 334 may have vegetation or generally may be some area where watering is desired. The portion 310 has been placed so that openings 8*a*-8*e*, 8*n*-8*r*, 8*k*-8*m*, and 8*x*-8*z* have been blocked to prevent water from flowing out of these openings. Thus water flows out of openings 8*f*-8*j* and 8*s*-8*w* onto section 334 while no water or substantially no water flows onto sections 332 or 336. Sections 332, 334, and 336 may have lengths of L11, L12, and L13 respectively, which may be any length.

Figure 5A:
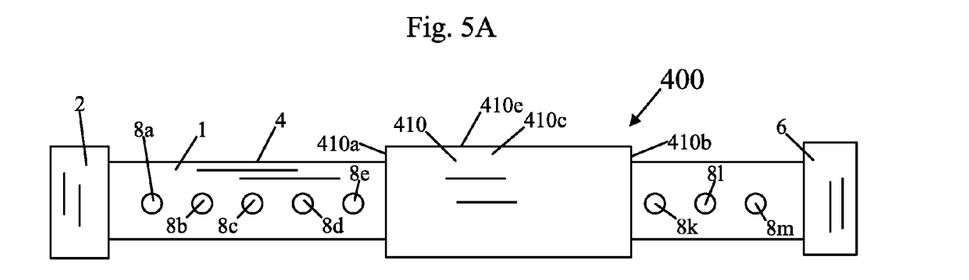
FIG. 5A shows a right side view of a fourth apparatus in accordance with another embodiment of the present invention.
Figures 5B, 5C:
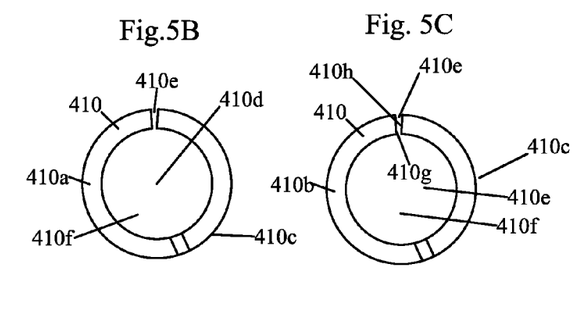
FIG. 5B shows a front view of the fourth apparatus of FIG. 5A.
FIG. 5C shows a rear view of the fourth apparatus of FIG. 5A.
Figure 5D:
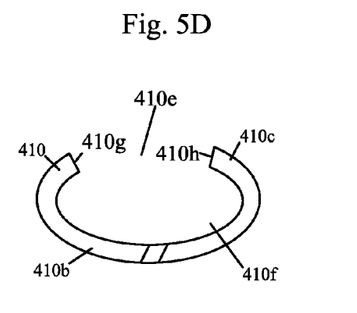
FIG. 5D shows a front view of a portion of the apparatus of FIG. 5A, wherein a gap of the portion has been widened.
Figure 5E:
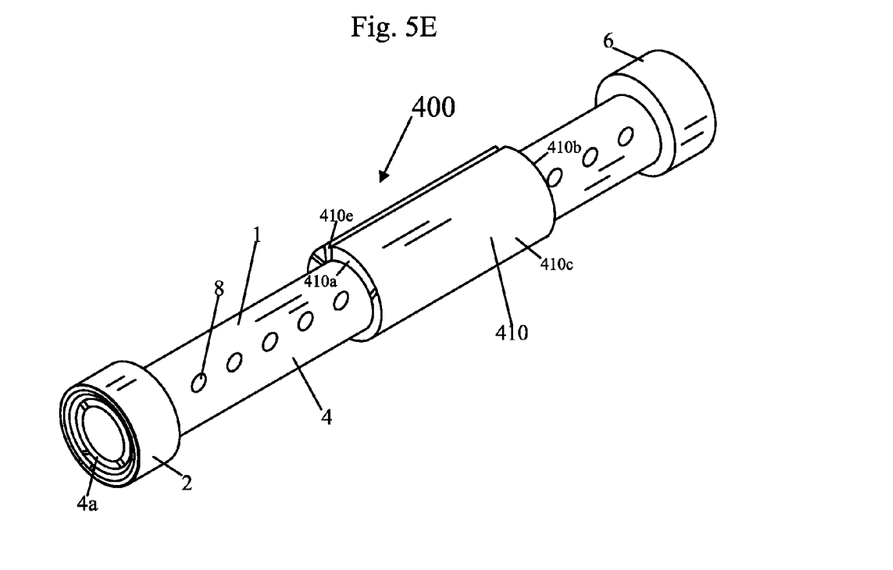
FIG. 5E shows a front, right side, and top perspective view of the fourth apparatus of FIG. 5A.

FIG. 5A shows a right side view of a fourth apparatus 400 in accordance with another embodiment of the present invention. FIG. 5B shows a front view of a portion 410 of the apparatus 400. FIG. 5C shows a rear view of the portion 410. FIG. 5D shows a front view of the portion 410, wherein a gap 410*e* has been widened. FIG. 5E shows a front, right side, and top perspective view of the fourth apparatus 400. The fourth apparatus 400 includes the portion 410. The portion 410 has ends 410*a* and 410*b*, body portion 410*c*, openings 410*d* and 410*e*, which lead to chamber 410*f*. The portion 410 also has a break, gap, slice or cut 410*e*, between ends or interior surfaces, 410*g* and 410*h*. In at least one embodiment, the portion 410 is made of a flexible material which can be pulled apart, as shown in FIG. 5D, to widen the gap 410*e*, between the surfaces or interior ends 410*g* and 410*h*, to thereby attach or detach the portion 410 from the body portion 4 of the apparatus 1.

More than one body portion 410 may be attached to the body portion 4 of the apparatus 1 to cover different holes of the plurality of holes 8, similar to what is shown in FIG. 4.

The body portions 110, 210, 310, 320, and 410 may be made of a non-porous material, and may be called an outer core portion. The body portions 110, 210, 310, 320, and 410 may be made from any material that is non-porous and/or at least non-porous enough so that it restricts the flow of water to a greater extent than do the openings 8*a*-8*z* of the body portion 4 of the apparatus 1 or soaker hose 1. For example, the outer core or body portions 110, 210, 310, 320 and 410 can be made of latex, Mylar (trademarked), silicone, rubber, a polymer, a shrink wrap material such as a shape memory polymer, wood, metal, alloy, fiber glass, a water proof resin, a glue water sealant, a bonding material, any recycled material, a vulcanized rubber, a polyethylene close cell foam cylinder shaped tube that has a hollow center into which the soaker hose is placed and/or a sleeve comprised of heat shrinkable strips woven into a flexible sleeve as described in U.S. Pat. No. 5,169,176 to Brossard.

The outer core material for body portions 110, 210, 310, 320 and 410 can comprise separate sections that can be selectively linked to together to form a longer section of outer core or the sections can be disconnected from each other and placed separate and apart from each other along the length of a soaker hose.

The material for body portions 110, 210, 310, 320 and 410 may be flexible, or rigid, or semi rigid. The material for body portions 110, 210, 310, 320, and 410 may be bendable and self-reforming or at least substantially self-reforming. The material for body portions 110, 210, 310, 320, and 410 may be non-self-reforming or at least substantially non self-reforming. The material for body portions 110, 210, 310, 320, and 410 may have elasticity. The body portions 110, 210, 310, 320, and 410 may be made of any material that can hold water or at least restrict the flow or water to a greater degree than the holes 8*a*-8*z* of the soaker hose or body portion 4 of the apparatus 1 over which the appropriate body portion of 110, 210, 310, 320, and 410 covers.

Although body portions 110, 210, 310, and 320 are shown as cylindrical tubes which completely surround a cross section of the body portion 4 of the apparatus or hose 1, the body portions do not have to completely surround a cross section of the body portion 4. For example, as shown in FIG. 5B, the gap 410*e* may be larger than shown when the body portion 410 is at rest, i.e. the ends 410*g* and 410*h* are not being pulled apart. For instance, the body portion 410 may be or may be replaced by a body portion that has a larger gap 410*e*, so that there is an opening at the top (where gap 410*e* is) and closed at the bottom (opposite the gap 410*e*, where the body portion 4 is placed on the ground surface).

In addition the body portion 410 may be or may be replaced by a U-shape or a V-shape cross section, for a larger gap 410*e*. In addition, a triangular cross section may be used, such as a triangular clip which can be pulled apart at the top for a larger gap to attach to body portion 4 of the apparatus 1.

Generally, in one or more embodiments, the body portion 110, 210, 310, 320, or 410, or a similar or identical body portion should be of a shape and comprised of a material that enables it to prevent, or at least substantially inhibit (to a greater extent than does the walls body portion 4 of the apparatus 1 or soaker hose 1) the flow of water that can exit through the pores or openings 8*a*-8*z* in the soaker hose or apparatus 1 into the inside of the body portion 110, 210, 310, 320, or 410 and into the ground beneath it.

The outer core water barrier of body portions 110, 210, 310, 320, and 410, can form a loose enclosure or semi enclosure around or substantially around the body portion 4 of the apparatus 1 or soaker hose 1 or it can form a tight enclosure around or substantially around the soaker hose or apparatus 1.

For instance, the outer core or body portions 110, 210, 310, 320, and 410 can be a hose that has an interior diameter D2 shown in FIG. 2C. The interior diameter D2 may be slightly less than the outer diameter D1 shown in FIG. 2B of the body portion 4 of the hose 1, so that if the body portion 110 is made of a flexible material it will snugly fit on the body portion 4 to prevent water flow through the appropriate holes 8 where the body portion 110 is located. Alternatively, the interior diameter D2, shown in FIG. 2C, may be slightly greater than the outer diameter D1 of body portion 4 of apparatus or hose 1 and some water may be allowed to flow out of the ends 110*a* and 110*b* of the body portion 110 (or of ends of body portions 210, 310, 320, or 410).

The outer non-porous encasement or body portion 110, 210, 310, 320, and/or 410 can also fit snuggly around the body portion 4 of the apparatus or soaker hose 1. For instance, the outer encasement or body portions 110, 210, 310, 320, and/or 410 can comprise a latex sock/sheath that can be selectively adjusted by the user longer or shorter along the length of the soaker hose, such as shown in the example of body portion 210 in FIGS. 3A-3B. In at least one embodiment, the body portion 210 can be rolled shorter or longer along the body portion 4 of the apparatus 1 or soaker hose 1 the way a surgeon may roll his latex gloves higher or shorter along the length of his forearms. When an outer encasement such as this is used the water that would normally exit the body portion 4 of the apparatus 1 or soaker hose 1 is prohibited from doing so because the outer core or body portion 110, 210, 310, 320, and 410 act as a water barrier sheath that prevents the water from exiting the appropriate holes of 8a-8z, going through the walls of the body portion 4 of the soaker hose or apparatus 1.

In at least one embodiment, the body portions 110, 210, 310, 320, and 410 can be permanently bonded onto the soaker hole outer surface of one or more of holes 8a-z, and also contain other sections of non-porous and/or substantially non-porous outer core, such as body portions 110, 210, 310, 320, and 410, that can be selectively attached or detached from the soaker hose and/or that can be slid along and/or relocated and or adjusted for length along the length of the body portion 4 of the apparatus or soaker hose 1 as the user might require. For instance, the permanent outer core section (such as one of body portions 110, 210, 310, 320, and 410) can be bonded to the first two feet of the soaker hose or apparatus 1, from the first end, such as end 4a, shown in FIG. 2A of the soaker hose where it can be attached to a water supply through a connector 2, and then the soaker hose or apparatus 1, can comprise an unclad section of one of body portions 110, 210, 310, 320, and 410, that could extend for a distance of, for instance nine feet and thereafter the body portion 4 of the soaker hose or apparatus 1 could comprise a removable and or movable non-permanent non-porous outer core of one of body portions 110, 210, 310, 320, and 410, for a length of six feet and thereafter the body portion 4 of the apparatus or soaker hose 1 could extend for example, another eight feet without out any outer core (of body portions 110, 210, 310, and 410) and thereafter the body portion 4 of the apparatus or soaker hose 1 could have a permanent outer core (of body portions 110, 210, 310, 320, and 410) up to the distal second end of the apparatus or soaker hose 1.

The outer core or one or more of body portions 110, 210, 310, 320, and 410, can be permanently attached, such as by bonding, or glued or pressure fit or any other means, to the body portion 4 of the apparatus or hose 1 in sections along the length of the body portion 4 of the apparatus or hose 1 that are shorter than the length of the soaker hose or the permanent outer core of one or more of body portions 110, 210, 310, 320, and 410 can extend from one end of the body portion 4, such as end 4a, of the soaker hose or apparatus 1, to the other end, such as end 4b, shown in FIG. 2B, with intermittent gaps so that water can permeate out of appropriate holes of holes 8a-8z of the body portion 4 of the apparatus or hose 1 and into the ground. The soaker hose or apparatus 1 can comprise the soaker hose 1 and a non-porous outer core, such as one or more of body portions 110, 210, 310, 320, and 410, wherein the outer core is permanently bonded onto the body portion 4 of the apparatus or soaker hose 1 by, and wherein the non-porous outer core, such as one or more of body portions 110, 210, 310, 320, and 410, is located on a section of the body portion 4 of the apparatus or soaker hose 1 that is not abutting the water section of the body portion 4 of the apparatus 1 that is nearest the water source.

A semi-permanent (i.e. selectively attachable or detachable outer core, and/or selectively movable outer core) outer core for one or more of the body portions 110, 210, 310, 320, and 410 can be located along any length of the body portion 4 of the apparatus or sprinkler or soaker hose 1 including in a location along the body portion 4 of the apparatus 1 or soaker hose 1 that is apart from or in contact with the distal ends of the body portion 4 of the soaker hose. The outer core, such as one or more of body portions 110, 210, 310, 320, and 410 can be one continuous length or it can comprise a plurality of lengths that can be placed either contiguous to each other (i.e. end to end) along the body portion 4 of the apparatus or soaker hose 1 or can be placed along the body portion 4 of the apparatus or soaker hose 1 in separate locations along the body portion 4 of the apparatus 1. The plurality of outer core sections (such as one or more of body portions 110, 210, 310, 320, and 410) can be of various lengths or can all be of the same length.

The non-porous outer core (such as one or more of body portions 110, 210, 310, 320, and 410) can also be non-permanently attached to a portion of the body portion 4 of the apparatus 1 or soaker hose 1. The non-porous outer core (such as one or more of body portions 110, 210, 310, 320, and 410) can be adjustable in length or nonadjustable in length. The non-porous outer core (such as one or more of body portions 110, 210, 310, 320, and 410) can comprise a single section or a plurality of sections. The non-porous outer core can be selectively attached or detached from the body portion 4 of the apparatus 1 or hose 1 and/or can be selectively slid along the hose 1 to selectively cover different portions or holes of holes 8a-8z of the hose or apparatus 1.

The permanent and non-permanent non-porous outer core (such as one or more of body portions 110, 210, 310, 320, and 410) can be of a diameter or shape that is fitted tight to the body portion 4 along the length of the outer core or along part of the length of the outer core. Or, a permanent non-porous outer core (such as one or more of body portions 110, 210, 310, 320, and 410) can be of a diameter or shape so that it is loosely fitted along the entire length of the outer core along the body portion 4 or along a portion of the body portion 4 of the hose or apparatus 1. In this regard, when the outer core is fitted loosely around the inner soaker hose, the water that exits the soaker hose can drip into the non-porous outer core and then run out the open distal end or ends of the other core. When this occurs, the outer core end can be located so that the water discharged out the end of the hose runs into the ground in the area that is to be irrigated.

In one embodiment, the outer portion or portions, such as one or more of body portions 110, 210, 310, 320, and 410, can comprise a non-porous tube made of, for instance, flexible plastic wherein the inner diameter of the plastic outer tube is larger than the outer diameter of the body portion 4 of the apparatus or soaker hose 1. The outer portion(s), such as one or more of body portions 110, 210, 310, 320, and 410, can be of different lengths and can be slid along the length of the body portion 4 of the apparatus or soaker hose 1 to distances selected by the user. The areas of the body portion 4 of the soaker hose or apparatus 1 that are not encircled by the outer tube of one or more of body portions 110, 210, 310, 320, and 410, can be placed on the ground that is to be irrigated and the water exiting the body portion 4 of the apparatus or soaker hose 1 in those areas will enter the ground as desired. The water exiting the appropriate holes of holes 8a-8z of the body portion 4 of the apparatus or soaker hose 1 along the sections of the body portion 4 of the apparatus 1 that are encircled by the outer hose or one or more of body portions 110, 210, 310, 320, and 410, will collect in the outer hose (110, 210, 310, 320, and 410) and then move out the end or ends of the outer hose. In this way the water discharged out the ends of the outer hose will not be wasted but can be discharged onto the ground that is intended to be irrigated. If the body portion 4 of the apparatus of soaker hose 1 and outer hose (110, 210, 310, 320, and 410) is located on level ground the water will discharge out of both ends of the outer hose (110, 210, 310, 320, and 410), but if the body portion 4 of the apparatus or hose 1 is located on an inclined surface the water will flow out of the lower end of the outer hose (110, 210, 310, 320, and 410).

In another embodiment, outer core (110, 210, 310, 320, and 410) can be made of a heat shrink tube material such as a shrink wrap polymer tube that has a fifth state and sixth state wherein in the sixth state the diameter of the s heat shrink tube becomes smaller than in the fifth state. In the fifth state (such as for example FIG. 3B) the inside diameter of the shrink wrap tube is in an expanded state such that it can be easily moved from one location to another along the soaker hose in which it encircles. The heat shrink tube can go to the sixth state when activated by a catalyst such as temperature, such as heat, or any other catalyst. In one example, the heat shrink tube that goes to a sixth state when the tube (110, 210, 310, 320, and 410) can encircle part of the length of a body portion 4 of the apparatus 1 or soaker hose. When the heat shrink tube (such as 210, in FIGS. 3A and 3B) is heated, the heat shrink tube goes to the sixth state wherein the diameter of the shrink wrap tube, such as 210, becomes smaller, as shown in FIG. 3A and tightens around the outside walls of the body portion 4 of the apparatus 1 or soaker hose 1.

A heat shrink tube (such as one or more of 110, 210, 310, 320, and 410) may be comprised of a sleeve made of a flexible material such as rubber that has weaved therein heat shrink strips that when in the sixth state, compress the sleeve to cause it to have a smaller diameter so it will compress against the outer walls of the body portion 4 of the apparatus or soaker hose 1. Such a sleeve is described in U.S. Pat. No. 5,169,176, which is incorporated by reference herein in its entirety.

In another embodiment, the outer non-porous core (one or more of body portions 110, 210, 310, 320, and 410) can comprise an elastic thin walled water proof tube or sock such as rubber that acts to contain the water within the area of where it encircles the body portion 4 of the apparatus or soaker hose 1. The thin walled rubber tube can have side walls of such a length that allows the tube to be rolled along the outer surface of the body portion 4 of the apparatus or soaker hose 1 longer and shorter as desired by the user similarly to the way a surgical latex glove can be rolled shorter or longer up a person's wrist. In this way the outer core can be adjusted longer and shorter depending on the length of the portion of the soaker hose needed to be used for irrigation and the portion that is not needed for irrigation—e.g. the portion of the soaker hose in-between to plants that is not to be irrigated can be clad in the elastic outer core while the portion near the plants can be non-covered by the outer elastic core so that the water can drip out of the soaker hose in that area.

In another embodiment the body portion 4 of the apparatus 1 or soaker hose 1 can be encircled in a plastic tube (one or more of body portions 110, 210, 310, 320, and 410) that can be collapsible so that it can be made longer or shorter. The plastic tube can be stretched or collapsed can be like an accordion.

The outer core (one or more of body portions 110, 210, 310, 320, and 410) can also comprise a wrapping material such as waterproof taping that is wrapped around the outer surface of the body portion 4 of the apparatus or soaker hose 1 and prevents, or at least substantially prevents water from being discharged through the appropriate openings of the openings 8a-8z in the area of where the wrapping is installed around the outer surface of the body portion 4 of the apparatus 1 or soaker hose 1.

In at least one embodiment, a non-permanent outer core (one or more of body portions 110, 210, 310, 320, and 410) can be comprised of a tube that is circular, rectangular, or square or any other geometrical shape that encircles the outer walls of the body portion 4 of the apparatus 1 or soaker hose 1 without a seam. Alternatively, the outer non-porous core (of one or more of body portions 110, 210, 310, 320, and 410) can contain a seam fitting that can be opened up along the entire length of one or more of the body portions 110, 210, 310, 320, and 410, such as shown for portion 410 in FIGS. 5B-5D so that the body portion 4 of the apparatus or soaker hose 1 can be inserted inside of it and then closed. The outer core, such as 410, can remain closed by use of a male/female bent gloved fitting, a crimped fitting or pressure fitting or any other type of closure devise that effectively closes the outer core, such as 410, around the body portion 4 of the apparatus or inner soaker hose 1 so that water is contained, or at least substantially contained within the outer core or portion 410 and/or inside of the body portion 4 of the apparatus 1 or soaker hose along the length of the outer core hose or body portion 410 that encircles the body portion 4 of the apparatus 1 or soaker hose. In this manner the outer core, such as body portion 410 can be easily selectively attached or detached from the body portion 4 of the apparatus or soaker hose 1.

In other embodiment selective sections of the body portion 4 of the apparatus or soaker hose 1 are encased in a non-porous conduit (such as one or more of 110, 210, 310, 320, and 410) that diverts the water that leaks from the pores of the body portion 4 of the apparatus or soaker hose 1 to an irrigation area as selected by the user. The conduit (such as one or more of 110, 210, 310, 320, and 410) can be stretched apart along the top edge (such as shown by FIGS. 3A and 3B for portion 210, so that body portion 4 of apparatus 1 or soaker hose 1 can be inserted or removed from the conduit.

In another embodiment, the outer core material (such as one or more of portions 110, 210, 310, 320, and 410) can also be a cylindrical shaped closed cell polyethylene foam that is hollow and, for instance, similar to a pool toy know as a pool noodle. The closed cell polyethylene foam outer core section or sections could comprise a wall that encircles or at least substantially encircles the body portion 4 of the apparatus or soaker hose 1. The polyethylene wall of each of one or more portions 110, 210, 310, 320, and 410, can be any thickness. The polyethylene wall can be approximately ⅜ inch thick. The outer core (one or more of 110, 210, 310, 320, and 410) can also have polyethylene connector pipes similar to connector links used for pool noodles.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
    a flexible tube having a first opening at a first end, an opposing second opening at a second end, and a body portion between the first end and the second end;
    wherein the body portion has an inner cavity;
    wherein the body portion of the flexible tube has a plurality of further openings leading out from the inner cavity;
    wherein each of the plurality of further openings is smaller than the first opening and the second opening;

a first connector connected at the second end of the flexible tube, wherein the first connector is configured to be connected to a water source;

a first outer member having a first opening at a first end, an opposing second opening at a second end, and a body portion between the first end of the first outer member and the second end of the first outer member;

wherein the body portion of the first outer member is non porous;

wherein the first outer member substantially surrounds a portion of the flexible tube so that the first outer member blocks a first set of the plurality of further openings to inhibit liquid flow from the first set of the plurality of further openings;

wherein the first outer member is configured so that it can be stretched from a first state to a second state;

wherein in the first state the first outer member is configured to block the first set of the plurality of further openings to inhibit liquid flow from the first set of the plurality of further openings;

wherein in the second state the first outer member is configured to block a second set of the plurality of further openings to inhibit liquid flow from the second set of the plurality of further openings;

wherein the second set includes the first set of the plurality of further openings and an additional one or more openings of the plurality of further openings;

wherein the first outer member has a length in the first state;

wherein the first outer member has a length in the second state;

wherein the flexible tube has a length which is greater than twice the length of the first outer member in the first state;

wherein the length of the first outer member in the second state is between about twice as long as the length of the first outer member in the first state and the length of the flexible tube; and wherein the first outer member is made of a material so that the first outer member can be rolled out in order to stretch the first outer member from the first state to the second state.

2. The apparatus of claim 1 wherein
the first outer member is configured so that it can be slid along an outer surface of the body portion of the flexible tube from a first state to a third state;

wherein in the first state the first outer member is configured to block the first set of the plurality of further openings to inhibit liquid flow from the first set of the plurality of further openings;

wherein in the third state the first outer member is configured to block a third set of the plurality of further openings to inhibit liquid flow from the third set of the plurality of further openings;

wherein the first set and the third set are different.

3. The apparatus of claim 1
further comprising a second outer member having a first opening at a first end, an opposing second opening at a second end, and a body portion between the first end of the second outer member and the second end of the second outer member;

wherein the body portion of the second outer member is non porous; and wherein the second outer member substantially surrounds a portion of the flexible tube so that the second outer member blocks a third set of the plurality of further openings to inhibit liquid flow from the third set of the plurality of further openings; and wherein the first set, the second set, and the third set are different from each other.

4. The apparatus of claim 3 wherein
the first outer member is configured so that it can be attached or detached to the flexible tube, wherein when attached the first outer member blocks the first set of the plurality of further openings to inhibit liquid flow from the first set of the plurality of further openings, and wherein when detached the first outer member does not block the first set of the plurality of further openings to inhibit liquid flow from the first set of the plurality of further openings; and the second outer member is configured so that it can be attached or detached to the flexible tube, wherein when attached the second outer member blocks the third set of the plurality of further openings to inhibit liquid flow from the third set of the plurality of further openings, and wherein when detached the second outer member does not block the third set of the plurality of further openings to inhibit liquid flow from the third set of the plurality of further openings.

5. The apparatus of claim 3 wherein
the first outer member is configured so that it can be slid along an outer surface of the body portion of the flexible tube from the first state to a third state;

wherein in the third state the first outer member is configured to block a third set of the plurality of further openings to inhibit liquid flow from the third set of the plurality of further openings;

wherein the first set and the third set are different;

the second outer member is configured so that it can be slid along an outer surface of the body portion of the flexible tube from a fourth state to a fifth state;

wherein in the fourth state the second outer member is configured to block a fourth set of the plurality of further openings to inhibit liquid flow from the fourth set of the plurality of further openings;

wherein in the fifth state the first outer member is configured to block a fifth set of the plurality of further openings to inhibit liquid flow from the fifth set of the plurality of further openings; and wherein the fourth set and the fifth set are different.

6. The apparatus of claim 3 wherein
the second outer member is configured so that it can be stretched from a third state to a fourth state;

wherein in the third state the second outer member is configured to block the third set of the plurality of further openings to inhibit liquid flow from the third set of the plurality of further openings;

wherein in the fourth state the second outer member is configured to block a fourth set of the plurality of further openings to inhibit liquid flow from the fourth set of the plurality of further openings; and wherein the fourth set includes the third set of the plurality of further openings and an additional one or more openings of the plurality of further openings;

wherein the second outer member has a length in the third state;

wherein the second outer member has a length in the fourth state;

wherein the length of the second outer member in the fourth state is between about twice as long as the length of the second outer member in the third state and the length of the flexible tube.

7. The apparatus of claim 6 wherein
the first outer member is configured so that it automatically stretches in response to a variation in temperature; and the second outer member is configured so that it automatically stretches in response to a variation in temperature.

8. A method comprising:

connecting a first end of a flexible tube to a water source;

placing part of the flexible tube on a ground surface while the first end of the flexible tube is connected to the water source;

wherein the ground surface includes a first section and a second section;

wherein the flexible tube includes a body portion having a plurality of openings including a first set of openings and a second set of openings, wherein the first set and the second set are different; and wherein the part of the flexible tube is placed on the ground surface so that water comes out of the first set of openings in the flexible tube and falls onto the first section of the ground surface, and water from the second set of openings in the flexible tube is inhibited from falling onto the second section of the ground surface by a first outer member, which is non porous, and which blocks the second set of openings;

wherein the first outer member is configured so that it can be stretched from a first state to a second state;

wherein in the first state the first outer member is configured to block the second set of openings to inhibit liquid flow from the second set of openings;

wherein in the second state the first outer member is configured to block a third set of openings to inhibit liquid flow from the third set of openings;

wherein the third set of openings includes the second set of openings and an additional one or more openings of the plurality of openings;

wherein the first outer member has a length in the first state;

wherein the first outer member has a length in the second state;

wherein the flexible tube has a length which is greater than twice the length of the first outer member in the first state;

wherein the length of the first outer member in the second state is between about twice as long as the length of the first outer member in the first state and the length of the flexible tube; and wherein the first outer member is made of a material so that the first outer member can be rolled out in order to stretch the first outer member from the first state to the second state.

9. The method of claim 8 wherein the first outer member is configured so that it can be attached or detached to the flexible tube, wherein when attached the first outer member blocks the second set of openings to inhibit liquid flow from the second set of the openings, and wherein when detached the first outer member does not block the second set of openings to inhibit liquid flow from the second set of openings.

10. The method of claim 8 wherein the first outer member is configured so that it can be slid along an outer surface of the body portion of the flexible tube from a first state to a third state; and wherein in the third state the first outer member is configured to block a fourth set of openings of the plurality of openings to inhibit liquid flow from the fourth set of openings;

and wherein the fourth set of openings are different from the second set of openings.

11. The method of claim 8 wherein a second outer member substantially surrounds a portion of the flexible tube so that the second outer member blocks a fourth set of openings of the plurality of openings to inhibit liquid flow from the fourth set of the plurality of openings; and wherein the fourth set is different from the second set.

12. The method of claim 11 wherein the first outer member is configured so that it can be attached or detached to the flexible tube, wherein when attached the first outer member blocks the second set of openings to inhibit liquid flow from the second set of openings, and wherein when detached the first outer member does not block the second set of openings to inhibit liquid flow from the second set of openings; and the second outer member is configured so that it can be attached or detached to the flexible tube, wherein when attached the second outer member blocks the fourth set of openings to inhibit liquid flow from the fourth set of openings, and wherein when detached the second outer member does not block the fourth set of openings to inhibit liquid flow from the fourth set of openings.

13. The method of claim 11 wherein the first outer member is configured so that it can be slid along an outer surface of the body portion of the flexible tube from the first state to a third state;

wherein in the third state the first outer member is configured to block a fourth set of openings of the plurality of openings to inhibit liquid flow from the fourth set of the plurality of openings;

wherein the second set and the fourth set are different;

the second outer member is configured so that it can be slid along an outer surface of the body portion of the flexible tube from a fourth state to a fifth state;

wherein in the fourth state the second outer member is configured to block a fifth set of openings to inhibit liquid flow from the fifth set of openings;

wherein in the fifth state the first outer member is configured to block a sixth set of openings to inhibit liquid flow from the sixth set of the plurality of openings; and wherein the fifth set and the sixth set are different.

14. The method of claim 11 wherein the second outer member is configured so that it can be stretched from a third state to a fourth state;

wherein in the third state the second outer member is configured to block the fourth set of the plurality of further openings to inhibit liquid flow from the fourth set of the plurality of further openings;

wherein in the fourth state the second outer member is configured to block a fifth set of the plurality of further openings to inhibit liquid flow from the fifth set of the plurality of further openings; and wherein the fifth set includes the fourth set of the plurality of further openings and an additional one or more openings of the plurality of further openings.

15. The method of claim 14 wherein the first outer member is configured so that it automatically stretches in response to a variation in temperature; and the second outer member is configured so that it automatically stretches in response to a variation in temperature.

* * * * *